US011431513B1

(12) United States Patent
Cannata et al.

(10) Patent No.: US 11,431,513 B1
(45) Date of Patent: Aug. 30, 2022

(54) DECENTRALIZED AUTHORIZATION OF USER ACCESS REQUESTS IN A DISTRIBUTED SERVICE ARCHITECTURE

(71) Applicant: FMR LLC, Boston, MA (US)

(72) Inventors: Robert Cannata, Hingham, MA (US); Daman Dogra, Westford, MA (US); Siddharth Dixit, Morrisville, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/531,319

(22) Filed: Nov. 19, 2021

(51) Int. Cl.
*H04L 9/32* (2006.01)
*H04L 9/30* (2006.01)
*H04L 9/08* (2006.01)

(52) U.S. Cl.
CPC ............ *H04L 9/3268* (2013.01); *H04L 9/083* (2013.01); *H04L 9/3073* (2013.01); *H04L 9/3213* (2013.01)

(58) Field of Classification Search
None
See application file for complete search history.

(56) References Cited

U.S. PATENT DOCUMENTS

| | | | |
|---|---|---|---|
| 10,382,203 B1 * | 8/2019 | Loladia | H04L 63/06 |
| 10,673,840 B2 | 6/2020 | Shukla et al. | |
| 10,764,266 B2 | 9/2020 | Patwardhan et al. | |
| 10,880,087 B2 | 12/2020 | Martynov et al. | |
| 10,931,453 B2 | 2/2021 | Diaz et al. | |
| 11,032,270 B1 | 6/2021 | Tsarfati et al. | |
| 2018/0183793 A1 * | 6/2018 | Mandadi | H04L 9/3247 |
| 2018/0367528 A1 | 12/2018 | Schwarz et al. | |
| 2020/0028848 A1 * | 1/2020 | Gupta | G06F 21/105 |
| 2020/0358615 A1 | 11/2020 | Smolny et al. | |
| 2021/0067537 A1 * | 3/2021 | Khanna | G06F 21/31 |
| 2021/0377044 A1 * | 12/2021 | Leibmann | H04L 9/0891 |

* cited by examiner

*Primary Examiner* — Arezoo Sherkat
(74) *Attorney, Agent, or Firm* — Proskauer Rose LLP

(57) ABSTRACT

Methods and apparatuses are described for decentralized authorization of user access requests in a distributed service architecture. A gateway node receives a user access request from a remote computing device. The gateway generates a signed and encrypted access token based upon the user access request using an authorization service node and a key management service node. The gateway transmits the access token, the user access request, and a security certificate received from the authorization service to a security proxy node of a microservice container. The security proxy validates the certificate and the access token. The security proxy decrypts the access token using a public key from the certificate, and determines user authorization to access a service endpoint node based upon the decrypted token. The security proxy transmits the user access request to the service endpoint, which provides the remote device with access to services based upon the user access request.

16 Claims, 5 Drawing Sheets

FIG. 4

```
HEADER (402):
{
"alg": "RS256",
"typ": "JWT",
}

PAYLOAD (404):
{
"id": "123456",
"name": "John Doe",
"role": "admin",
"access": "read", "write", "delete",
}

SIGNATURE (406):
SHA256(
base64urlEncode(header) + "." +
base64urlEncode(payload),
<signature>
) signature base64 encoded
```

400

DECENTRALIZED AUTHORIZATION OF USER ACCESS REQUESTS IN A DISTRIBUTED SERVICE ARCHITECTURE

TECHNICAL FIELD

This application relates generally to methods and apparatuses, including computer program products, for decentralized authorization of user access requests in a distributed service architecture.

BACKGROUND

Many distributed computing architectures that service a large number of users and client devices aim to provide fast and efficient processing of user requests. As can be appreciated, some applications provided by distributed computing architectures require real-time or near real-time responsiveness to user requests—such as equity trading platforms that serve tens of millions of users. Key performance goals for such systems include low network and transaction latency, high uptime and service availability, and scalability of processing and service bandwidth.

However, it can be difficult to achieve these performance goals in distributed computing systems while also ensuring the implementation robust security via multi-layered user authentication and user authorization. In typical paradigms, user authorization is conducted by reference to a central repository or service, such as an access control database or enterprise policy service, that defines roles and permissions for specific users and/or groups of users to access application functionality. In these situations, user authorization requests all flow through the central repository—leading to bottlenecks in transaction processing and limitations on the scalability of services. For applications that require high responsiveness and scalability, these issues and limitations have a detrimental impact on system performance and user satisfaction.

SUMMARY

Therefore, what is needed are methods and systems for providing fast and seamless validation of user access requests in a distributed computing architecture without relying on a centralized authorization service. The techniques described herein advantageously enable decentralized user authorization through the use of microservice containers that are configured to evaluate user access requests and confirm user authorization on a per-request level using locally-provided policy management and key-based validation of tokenized access requests. As a result, the inventive methods and systems of the present disclosure beneficially achieve a robust, secure deployment of distributed service applications while also minimizing latency incurred by user authorization routines and enabling improved scalability and responsiveness of the applications.

The invention, in one aspect, features a computer system for decentralized authorization of user access requests in a distributed service architecture. The system comprises a gateway node, an authorization service node, a key management service node, and a plurality of microservice containers each comprising a security proxy node and a service endpoint node. The gateway node receives a user access request from a remote computing device. The gateway node generates a signed and encrypted access token based upon the user access request using the authorization service node and the key management service node. The gateway node transmits the access token, the user access request, and a security certificate received from the authorization service node to a security proxy node of a first one of the plurality of microservice containers. The security proxy node validates the security certificate and the access token received from the gateway node. The security proxy node decrypts the access token using a public key from the security certificate. The security proxy node determines user authorization to access the service endpoint node of the microservice container based upon the decrypted access token. The security proxy node transmits the user access request to the service endpoint node. The service endpoint node provides the remote computing device with access to one or more services based upon the user access request.

The invention, in another aspect, features a computerized method of decentralized authorization of user access requests in a distributed service architecture. A gateway node receives a user access request from a remote computing device. The gateway node generates a signed and encrypted access token based upon the user access request using an authorization service node and a key management service node. The gateway node transmits the access token, the user access request, and a security certificate received from the authorization service node to a security proxy node of a first one of a plurality of microservice containers. The security proxy node validates the security certificate and the access token received from the gateway node. The security proxy node decrypts the access token using a public key from the security certificate. The security proxy node determines user authorization to access the service endpoint node of the microservice container based upon the decrypted access token. The security proxy node transmits the user access request to a service endpoint node of the first one of the plurality of microservice containers. The service endpoint node provides the remote computing device with access to one or more services based upon the user access request.

Any of the above aspects can include one or more of the following features. In some embodiments, the gateway node authenticates the user access request before generating the signed and encrypted access token. In some embodiments, generating a signed and encrypted access token based upon the user access request using the authorization service node and the key management service node comprises generating, by the gateway node, an unencrypted access token comprising a user identifier associated with a user of the remote computing device and one or more access permissions associated with the user; transmitting, by the gateway node, the unencrypted access token to the authorization service node; requesting, by the authorization service node, a key pair from the key management service node, the key pair comprising a private key and the public key; signing and encrypting, by the authorization service node, the unencrypted access token using the private key; and transmitting, by the authorization service node, the signed and encrypted access token and the security certificate comprising the public key to the gateway node.

In some embodiments, determining user authorization to access the service endpoint node of the microservice container based upon the decrypted access token comprises: extracting, by the security proxy node, the user identifier and the one or more access permissions associated with the user from the decrypted access token; transmitting, by the security proxy node, the user identifier and the one or more access permissions associated with the user to a policy agent in the microservice container; and receiving, by the security proxy node from the policy agent, an indication to allow user access based upon the user identifier and the one or more access permissions. In some embodiments, validating the security certificate and the access token received from the gateway node comprises: requesting, by the security proxy node, the public key that corresponds to the access token from the key management service; validating, by the security proxy node, a signature in the security certificate using the public key; and validating, by the security proxy node, the access token using the security certificate. In some embodiments, the key management service node periodically rotates existing key pairs out of use and periodically rotates new key pairs into use.

In some embodiments, the plurality of microservice containers are independent of each other and the security proxy nodes of each microservice container do not use a central data repository or a central service to determine user authorization to access the service endpoint node of the microservice container based upon the decrypted access token. In some embodiments, providing the remote computing device with access to one or more services based upon the user access request comprises forwarding the user access request to one or more other service endpoint nodes that are coupled to the service endpoint node. In some embodiments, the one or more other service endpoint nodes provide the remote computing device with access to services based upon the user access request without requiring determination of user authorization to access the one or more other service endpoint nodes Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is a diagram of an exemplary decrypted access token.

DETAILED DESCRIPTION

Figure 1:
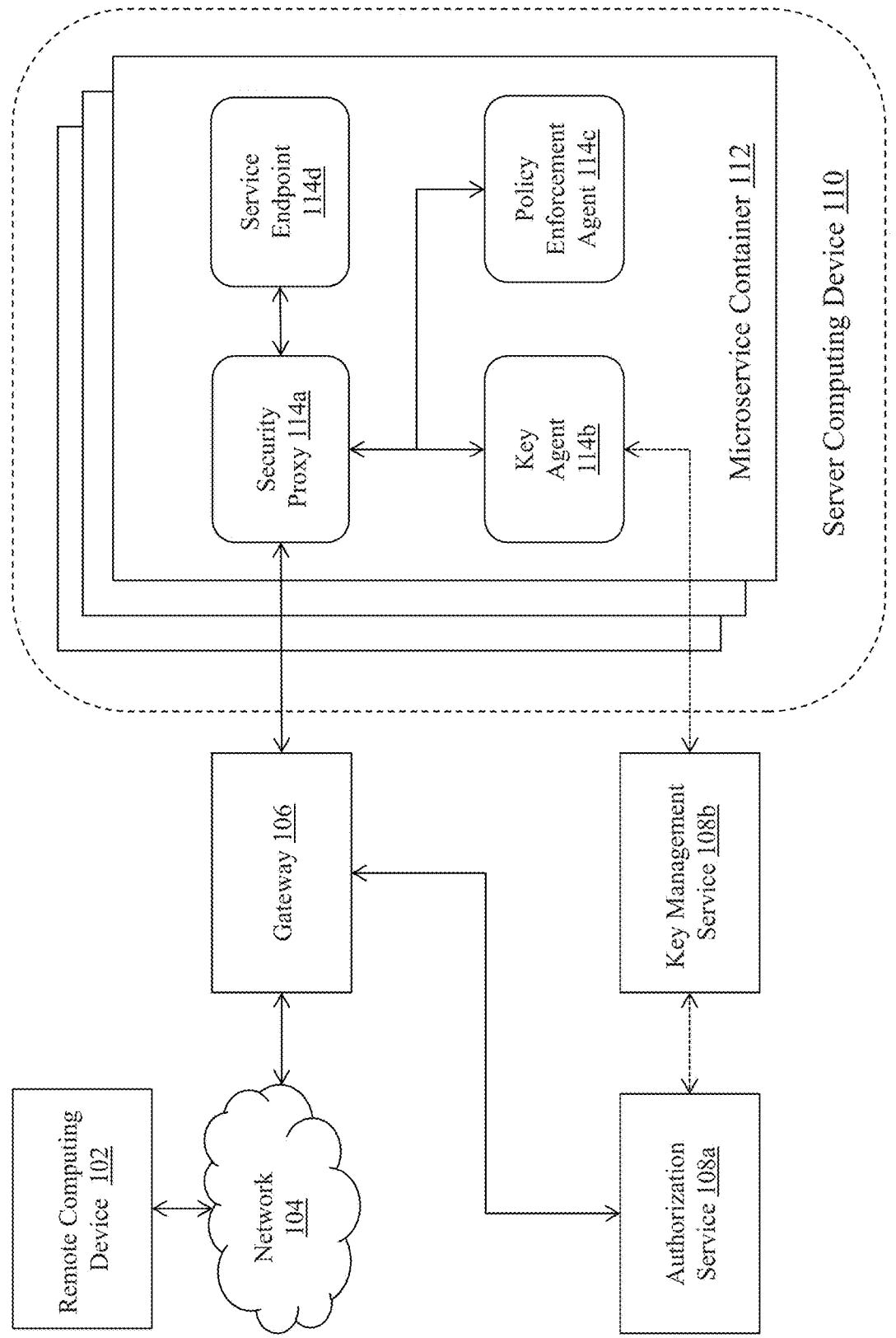
FIG. 1 is a block diagram of a system for decentralized authorization of user access requests in a distributed service architecture.

FIG. 1 is a block diagram of a system 100 for decentralized authorization of user access requests in a distributed service architecture. The system 100 includes a remote computing device 102, a communications network 104, a gateway node 106, an authorization service node 108a, a key management service node 108b, a server computing device 110 with a microservice container 112 that comprises a security proxy node 114a, a key agent node 114b, a policy enforcement agent node 114c, and a service endpoint 114d.

The remote computing device 102 connects to one or more communications networks (e.g., network 104) in order to communicate with the other components of the system 100 to provide input and receive output relating to requesting access to service endpoint 114d in microservice container 112 of server computing device 110 as described herein. Exemplary remote computing devices 102 include but are not limited to client computing devices such as desktop computers, laptop computers, tablets, mobile devices, and smartphones; web application servers; cloud-based computing systems; database management platforms; software-as-a-service (SaaS) platforms; sysadmin control devices; and the like. It should be appreciated that other types of computing devices that are capable of connecting to the components of the system 100 can be used without departing from the scope of invention. Although FIG. 1 depicts a single remote computing device 102, it should be appreciated that the system 100 can include any number of remote computing devices.

The communications network 104 enables the remote computing device 102 to communicate with the microservice container 112 of server computing device 110 via gateway node 106. The network 104 is in some embodiments a wide area network, such as the Internet and/or a cellular network. In some embodiments, the network 104 is comprised of several discrete networks and/or sub-networks (e.g., cellular to Internet). In some embodiments, the network 104 can be used to connect all or a portion of the components of system 100 to each other to perform the functionality associated with decentralized authentication of user access requests in a distributed service architecture as described herein.

The gateway node 106 is a computing device or devices including hardware and/or software modules that execute on a processor and interact with memory modules of the gateway node 106, to receive access requests from remote computing device 102, encapsulate the access requests with authorization information using the authorization service node 108a, and transmit the encapsulated access requests to the server computing device 110 for authorization of the access request by the security proxy node 114a and the provision of functionality from the service endpoint node 114d.

The authorization service node 108a is a computing device or devices including hardware and/or software modules execute on a processor and interact with memory modules of the authorization service node 108a, to provide authorization information to the gateway node 106 that is used to encapsulate the access request received from the remote computing device 102 for transmission to the security proxy node 114a of the server computing device 110. The authorization service node 108a operates in conjunction with the key management service node 108b, which is a computing device or devices including hardware and/or software modules execute on a processor and interact with memory modules of the key management service node 108b. The key management service node 108b creates, distributes, and rotates public and private key pairs that are used by the authorization service node 108a and the key agent node 114c for authorization processes as described herein.

The server computing device 110 is a computing device including specialized hardware and/or software modules that execute on a processor and interact with memory modules of the server computing device 110, to receive data from other components of the system 100, transmit data to other components of the system 100, and perform functions for decentralized authorization of user access requests in a distributed service architecture as described herein. In some embodiments, the server computing device 110 can comprise a plurality of physical computing devices, arranged in a variety of architectures, resources, and configurations (e.g., cluster computing, virtual computing, cloud computing) can be used without departing from the scope of the invention.

The server computing device 110 includes a plurality of microservice containers (e.g., container 112) that each comprise a security proxy node 114a, a key agent node 114b, a policy enforcement agent node 114c, and a service endpoint node 114c. In some embodiments, the nodes 114a, 114b, 114c, 114d are specialized sets of computer software instructions programmed onto one or more dedicated processors in the server computing device 110. The functionality of the microservice containers (e.g., container 112) and nodes 114a-114d will be described in greater detail throughout this specification.

It is important to note that the system 100 does not include a centralized repository or service that processes authorization requests received from remote computing devices. As mentioned above, such centralized mechanisms for authorizing users typically result in increased latency and reduced scalability, as authorization requests must be processed by the central authority—which can cause bottlenecks and delays in determining user access policies and permissions, and responding to authorization requests. Instead, as described herein, the present systems and methods advantageously employ a decentralized authorization architecture, where each microservice container (e.g., container 112) performs user authorization for service access requests that are received by the container and not relaying the requests to, or otherwise interfacing with, a central database. This results in much faster authorization of user access requests with appropriate resources made available for the user's specific profile and policies, which leads to lower overall latency on transactions and functionality provided by the service endpoint node (e.g., node 114d).

Figure 2:
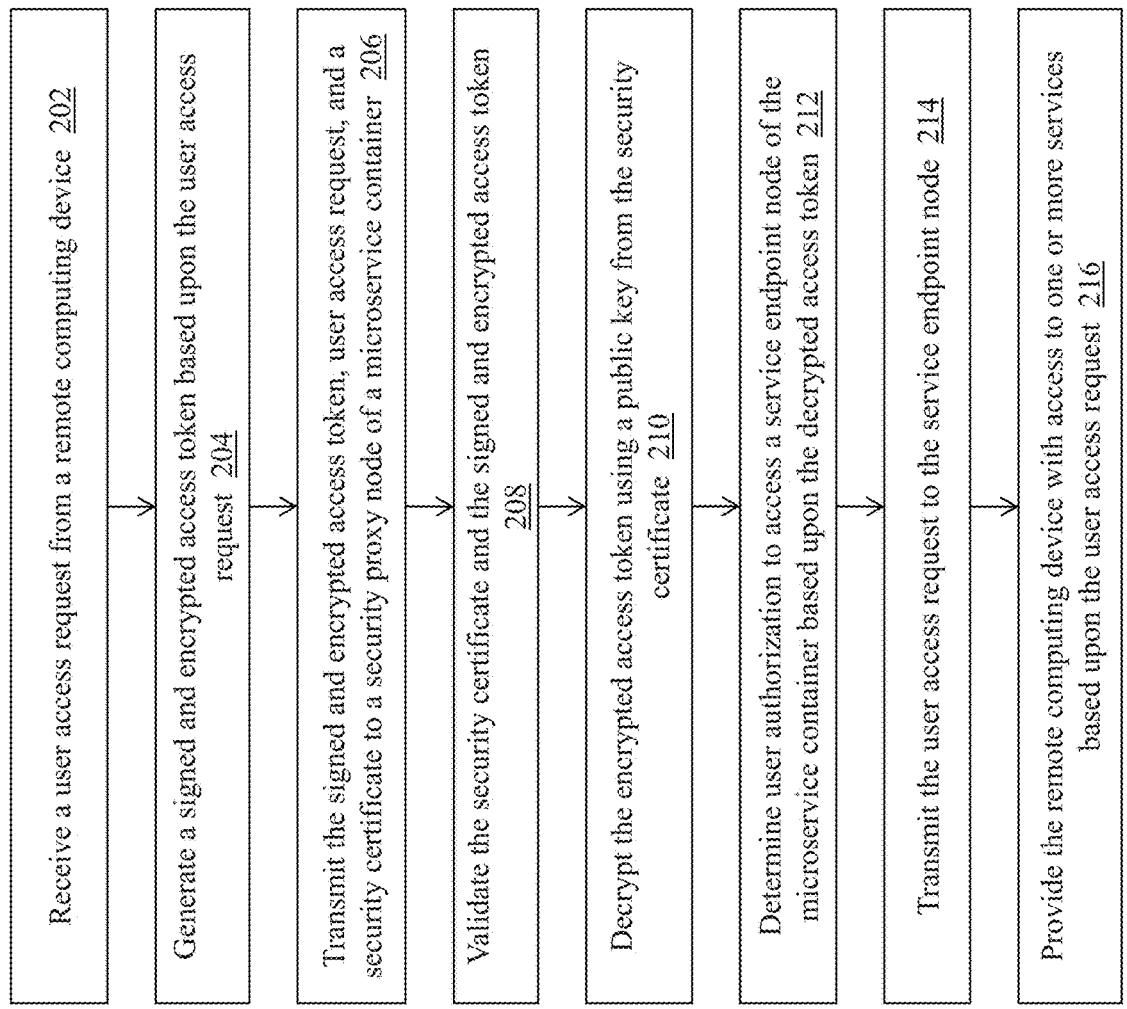
FIG. 2 is a flow diagram of a computerized method of decentralized authorization of user access requests in a distributed service architecture.

FIG. 2 is a flow diagram of a computerized method 200 of decentralized authentication of user access requests in a distributed service architecture, using the system 100 of FIG. 1. The gateway node 106 receives (step 202) a user access request from a remote computing device 102 (e.g., via network 104). A user at remote computing device 102 (which may be a client computing device) can establish a connection to gateway node 106 and submit a user access request for certain service functionality (e.g., to access the user's account information, perform a transaction such as a stock trade, etc.) provided by one or more service endpoint nodes 114d. For example, the user at remote computing device 102 accesses a web browser or native application installed on the remote computing device 102 to, e.g., submit user credentials (username, password) and transmit the user access request including the user credentials to the gateway node 106. In some embodiments, the gateway node 106 performs authentication on the submitted user credentials in order to verify that the remote computing device 102 and/or user at the device 102 is valid. In some embodiments, the remote computing device 102 can perform authentication of the user and/or user credentials prior to sending the user access request to the gateway node 106. In either case, the user authentication can be performed by transmitting the user credentials to a remote service that uses one or more authentication methods to verify the user credentials and confirm that the requesting user is legitimate.

In some embodiments, the remote computing device 102 is a computing device (such as another server computing device) which is not necessarily controlled directly by a user, that submits an access request for information or functionality to the server computing device 108 and the server computing device 108 must authenticate the remote computing device 102 in order to process the access request.

Upon receiving the user access request, the gateway node 106 generates (step 204) a signed and encrypted access token based upon the user access request. In some embodiments, the gateway node 106 performs this step by first creating an unencrypted access token based upon the user access request. For example, at the time the user access request is received, the gateway node 106 retrieves one or more claims that define certain access control parameters and features of the user. For example, the claims can comprise one or more roles assigned to the user, an id of the user, one or more resources (such as accounts, services, functionality, etc.) that the user is allowed to access, and the like. The gateway node 106 creates an access token (i.e., JSON Web Token (JWT) as described at datatracker.ietf.org/doc/html/rfc7519 which is incorporated herein by reference) to store the user's claims and transmits the unencrypted access token to the authorization service node 108a. The authorization service node 108a requests a private key or a private-public key pair from the key management service node 108b to be used in signing and encrypting the unencrypted access token. For example, the authorization service node 108a can store a digital certificate (e.g., x509 certificate) that contains a public key paired to the private key received from node 108b. In another example, the key management service node 108b provides a public-private key pair to the authorization service node 108a. In one embodiment, the key management service node 108b uses public key infrastructure (PKI) to manage the signing and encryption process. Details regarding the implementation of a public key infrastructure are described at en.wikipedia.org/wiki/Public_key_infrastructure, which is incorporated herein by reference. The key management service node 108b creates, distributes and rotates the public keys used by the system 100. As shown in FIG. 1, the key management service node 108b is communicably coupled to the key agent node 114b in each microservice container 112. As will be explained in detail below, the key agent node 114b receives public keys from the key management service node 108b in order to validate and decrypt access tokens received as part of user access requests.

In some embodiments, the authorization service node 108a uses the private key from the key pair to encrypt and sign the unencrypted access token. For example, the node 108a creates a hash value for the unencrypted access token using, e.g., a cryptographic hash algorithm. Then, the node 108a encrypts the hash value using the private key obtained from the key management service node 108b and incorporates the encrypted hash value (i.e., the signature) into the access token—thereby generating a signed and encrypted access token associated with the user/remote computing device 102. The authorization service node 108a transmits the signed and encrypted access token and the digital certificate containing the public key (which can be stored at the authorization service node 108a) to the gateway node 106.

The gateway node 106 then transmits (step 206) the signed and encrypted access token and public key digital certificate received from node 108a, and the user access request as originally received from the remote computing device 102, to a security proxy node 114a of a microservice container 112 at server computing device 110. As can be appreciated, the server computing device 110 can comprise a plurality of microservice containers 112, each associated with a different application, service, or other functionality provided by the server computing device 110. The implementation of a plurality of microservice containers enables the server computing device 110 to utilize shared resources (e.g., namespaces, filesystem volumes, network resources, storage, etc.) for multiple independent software images and related dependencies, for a plurality of individual users. An example microservice architecture that can be used by the systems and methods described herein is the Kubernetes™ platform (available from kubernetes.io), in which pods are deployed to host one or more application containers that work together to provide a unit of service (such as access to and functionality from a service endpoint) to the remote computing device 102. The nodes 114a-114d of microservice container 112 operate to verify the remote computing device's authorization to access the requested service(s) and functionality and to provide the requested service(s) to the remote computing device 102. Due to the decentralized and scalable nature of the microservice architecture, each user request can be processed by a different microservice container 112—enabling efficient parallel processing of user requests and minimal latency or bottlenecking disruptions.

The security proxy node 114a receives the user access request, the signed and encrypted access token, and the public key certificate from the gateway node 106, and the node 114a validates (step 208) the public key security certificate and the signed and encrypted access token and decrypts (step 210) the access token. In some embodiments, the security proxy node 114a requests the public key that corresponds to the signed and encrypted access token from the key agent node 114b in the microservice container 112. As mentioned above, the key agent node 114b is communicably coupled to the key management service node 108b in order for the node 114b to receive public keys used to validate and decrypt the access token. As can be appreciated, the key management service node 108b periodically rotates public keys in and out of use and coordinates with the key agent node 114b to ensure that the up-to-date set of public keys is available at the key agent node 114b.

Figure 3:
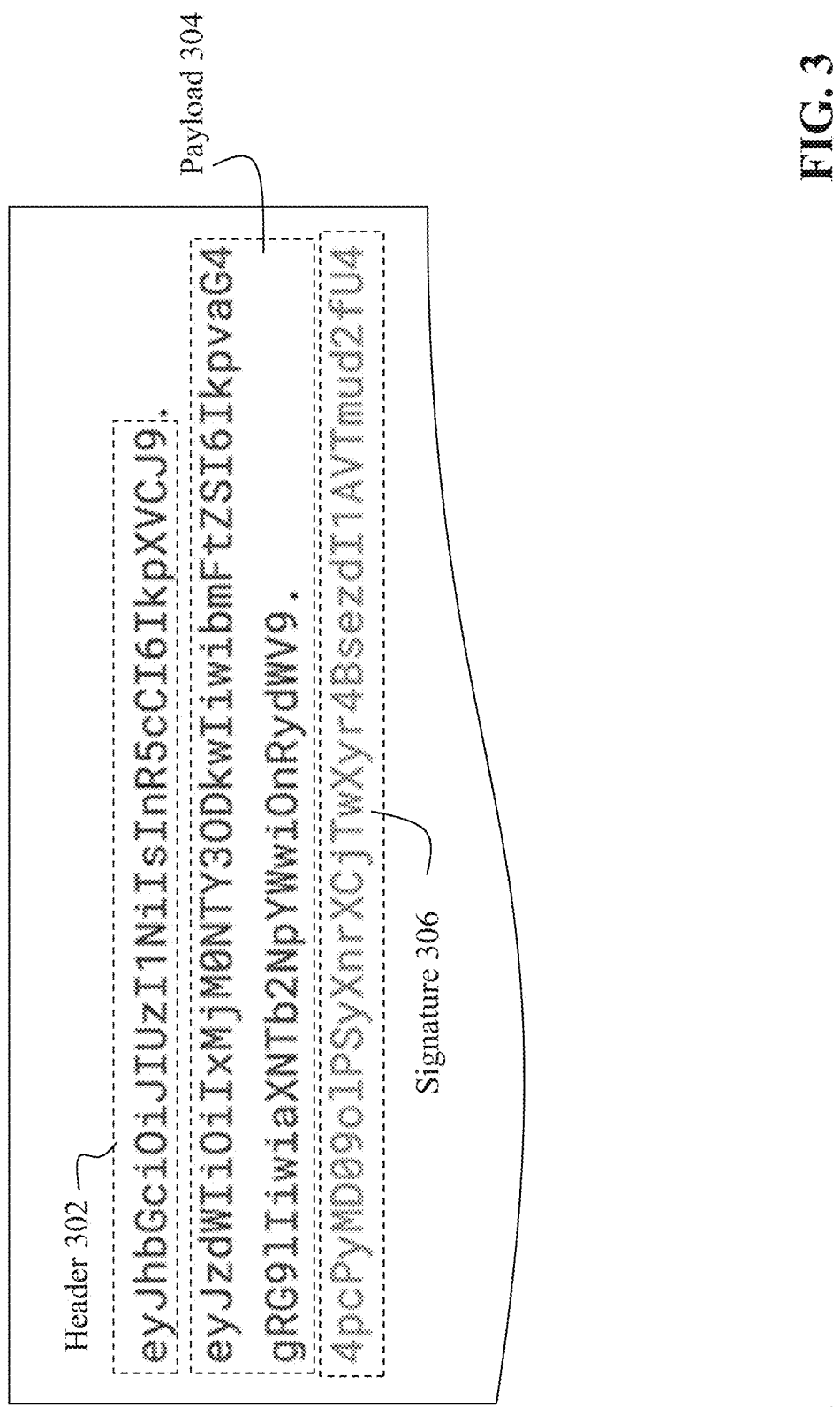
FIG. 3 is a diagram of an exemplary signed and encrypted access token.

The node 114a then validates the signature in the certificate using the public key. In some embodiments, the security proxy node 114a can analyze characteristics of the access token to ensure that the access token conforms to an expected structure. The node 114a can verify that the access token contains three segments, separated by two period characters. The node 114a can parse the access token to extract the three segments—the Header, the Payload, and the Signature. In an example, each segment is encoded using base64url (as described in RFC4648, The Base16, Base32, and Base64 Data Encodings, available at datatracker.ietf.org/doc/html/rfc4648, which is incorporated by reference). An exemplary signed and encrypted access token 300 is shown in FIG. 3. The token 300 includes a Header 302, a Payload 304, and a Signature 306. The Header 302 comprises metadata about the type of token, cryptographic algorithm(s) used to encrypt the token, and the like. The Payload 304 comprises the set of claims, i.e., the security statements noted above such as the user id, user roles, and resources that the user is allowed to access. The Signature 306 comprises the data used to verify that the access token is valid.

The security proxy node 114a can decode the Header and Payload using base64url and (i) ensure that the decoded Header and Payload have no line breaks, whitespace, or other additional characters and (ii) verify that the decoded Header and Payload are valid JSON objects. FIG. 4 is a diagram of an exemplary decoded access token 400. As shown in FIG. 4, the decoded access token comprises a JSON object for the Header 402 and a JSON object for the Payload 404. The decoded access token 400 also comprises a Signature section 406 with the algorithm used to create the signature. Next, the security proxy node 114a can verify the Signature. In some embodiments, the node 114a can generate a new signature using the public key and verify that the new signature matches the signature in the digital certificate. To generate a new signature, the node 114a can take the original base64url-encoded Header and Payload segments and hash them using a cryptographic hash (e.g., SHA-256, as described at en.wikipedia.org/wiki/SHA-2). Then, the node 114a can encrypt the cryptographic hash using the public key and encode the result with base64url. If the new encoded signature matches the signature in the access token, then the access token is verified. It should be appreciated that the above description is merely an example of validating the access token and other approaches can be used without departing from the scope of invention described herein.

Once the access token is validated and decrypted, the security proxy node 114a determines (step 212) user authorization to access the service endpoint node 114d of the microservice container 112 based upon the decrypted access token. In some embodiments, the security proxy node 114a extracts the user identifier (e.g., user id) and the one or more access permissions (e.g., claims) associated with the user from the Payload of the decrypted access token. The security proxy node 114a transmits the user identifier and the one or more access permissions associated with the user to the policy enforcement agent node 114c in the microservice container. The policy enforcement agent node 114c is configured to enforce both coarse-grained and fine-grained access control policies according to the received user id and access permissions. For example, the policy enforcement agent node 114c can analyze the user id and the claims using one or more preconfigured policies to determine whether the requested access complies with the user's permissions for access to the service endpoint node 114d and/or specific functionality of the node 114d. Based upon this analysis, the node 114c can generate an indication that the user is allowed (or the user is not allowed) to access the service endpoint node 114d according to the request. The policy enforcement agent node 114c returns the indication to the security proxy node 114a.

When access is granted by the policy enforcement agent node 114c, the security proxy node 114a transmits (step 214) the user access request to the service endpoint node 114d, and the service endpoint node 114d provides (step 216) the remote computing device 102 with access to one or more services based upon the user access request. For example, the security proxy node 114a can establish a connection between the remote computing device 102 and the service endpoint node 114d (e.g., using a URL or other type of address or reference pointer to the service endpoint). The service endpoint node 114d can receive the user access request from the security proxy node 114a and process the user access request in order to respond to the user access request with the desired resources. For example, the service endpoint node 114d can retrieve data, execute one or more transactions, and the like in response to the user access request.

In some embodiments, the service endpoint node 114d calls to one or more other service endpoints and/or network resources that are not in the microservice container 112 in order to respond to the user access request. In these embodiments, the techniques described herein advantageously enable the user access request to be processed by these other endpoints without requiring further authorization of the remote computing device 102 and/or the user of device 102—because the user access request has already been authorized by the security proxy node 114a.

Figure 5:
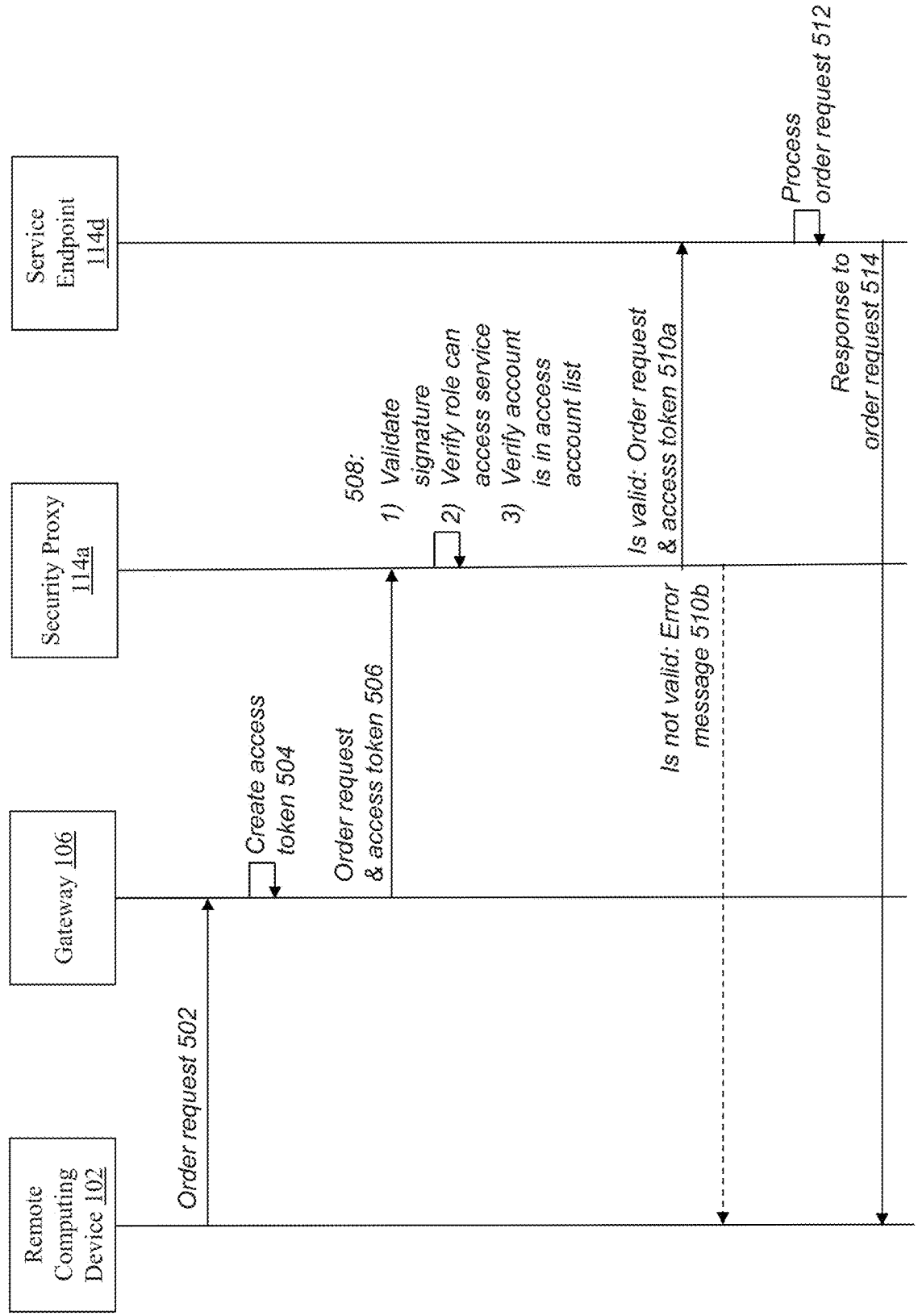
FIG. 5 is a diagram of an exemplary workflow for decentralized authorization of user access requests in a distributed service architecture

FIG. 5 is a diagram of an exemplary use case workflow for decentralized authorization of user access requests in a distributed service architecture, using the system 100 of FIG. 1. At step 502, an authenticated user at remote computing device 102 generates and transmits an order request to gateway 106. The order request includes an account number. At step 504, gateway 106 creates a signed access token with one or more user access claims, e.g., identifying a user id, one or more roles for the user id, and a list of accounts the user id can access. At step 506, gateway 106 transmits the signed access token and the order request to security proxy 114a in microservice container 112 at server computing device 110. At step 508, security proxy 114a performs several steps: 1) validation of the signature on the access token; 2) verification that the user role in the access token has access to the service endpoint 114d requested in the order request; and 3) verification that the account in the order request is in the list of accounts in the access token. If the request is valid, at step 510a security proxy 114a transmits the order request to service endpoint 114d, at step 512 service endpoint 114d processes the order request and at step 514 service endpoint 114d transmits a response to the order request to remote computing device 102. If the request is not valid, at step 510b security proxy 114a transmits a security error message to remote computing device 102.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for decentralized authorization of user access requests in a distributed service architecture, the system comprising:
a gateway node,
an authorization service node,
a key management service node, and
a plurality of microservice containers each comprising a security proxy node and a service endpoint node;
wherein the gateway node:
receives a user access request from a remote computing device;
generates a signed and encrypted access token based upon the user access request using the authorization service node and the key management service node, comprising:
generating an unencrypted access token comprising a user identifier associated with a user of the remote computing device and one or more access permissions associated with the user, and
transmitting the unencrypted access token to the authorization service node,
wherein the authorization service node:
requests a key pair from the key management service node, the key pair comprising a private key and the public key,
signs and encrypts the unencrypted access token using the private key, and
transmits the signed and encrypted access token and the security certificate comprising the public key to the gateway node; and
transmits the access token, the user access request, and a security certificate received from the authorization service node to a security proxy node of a first one of the plurality of microservice containers;
wherein the security proxy node of the first one of the plurality of microservice containers:
validates the security certificate and the access token received from the gateway node;
decrypts the access token using a public key from the security certificate;
determine user authorization to access the service endpoint node of the microservice container based upon the decrypted access token; and
transmit the user access request to the service endpoint node; and
wherein the service endpoint node of the first one of the plurality of microservice containers:
provides the remote computing device with access to one or more services based upon the user access request.

2. The system of claim 1, wherein the gateway node authenticates the user access request before generating the signed and encrypted access token.

3. The system of claim 1, wherein the security proxy node of the first one of the plurality of microservice containers determining user authorization to access the service endpoint node of the microservice container based upon the decrypted access token comprises:
extracting the user identifier and the one or more access permissions associated with the user from the decrypted access token;
transmitting the user identifier and the one or more access permissions associated with the user to a policy agent in the microservice container; and
receiving from the policy agent in the microservice container an indication to allow user access based upon the user identifier and the one or more access permissions.

4. The system of claim 1, wherein the security proxy node of the first one of the plurality of microservice containers validating the security certificate and the access token received from the gateway node comprises:
requesting the public key that corresponds to the access token from the key management service;
validating a signature in the security certificate using the public key; and
validating the encrypted access token using the security certificate.

5. The system of claim 1, wherein the key management service node periodically rotates existing key pairs out of use and periodically rotates new key pairs into use.

6. The system of claim 1, wherein the plurality of microservice containers are independent of each other and the security proxy nodes of each microservice container do not use a central data repository or a central service to determine user authorization to access the service endpoint node of the microservice container based upon the decrypted access token.

7. The system of claim 1, wherein the service endpoint node providing the remote computing device with access to one or more services based upon the user access request comprises forwarding the user access request to one or more other service endpoint nodes that are coupled to the service endpoint node.

8. The system of claim 7, wherein the one or more other service endpoint nodes provide the remote computing device with access to services based upon the user access request without requiring determination of user authorization to access the one or more other service endpoint nodes.

9. A computerized method of decentralized authorization of user access requests in a distributed service architecture, the method comprising:

receiving, by a gateway node, a user access request from a remote computing device;

generating, by the gateway node, a signed and encrypted access token based upon the user access request using an authorization service node and a key management service node, comprising:

generating an unencrypted access token comprising a user identifier associated with a user of the remote computing device and one or more access permissions associated with the user, and transmitting the unencrypted access token to the authorization service node, wherein the authorization service node:

requests a key pair from the key management service node, the key pair comprising a private key and the public key, signs and encrypts the unencrypted access token using the private key, and transmits the signed and encrypted access token and the security certificate comprising the public key to the gateway node;

transmitting, by the gateway node, the access token, the user access request, and a security certificate received from the authorization service node to a security proxy node of a first one of a plurality of microservice containers;

validating, by the security proxy node, the security certificate and the access token received from the gateway node;

decrypting, by the security proxy node, the access token using a public key from the security certificate;

determining, by the security proxy node, user authorization to access the service endpoint node of the microservice container based upon the decrypted access token; and transmit the user access request to a service endpoint node of the first one of the plurality of microservice containers; and providing, by the service endpoint node, the remote computing device with access to one or more services based upon the user access request.

10. The method of claim 9, wherein the gateway node authenticates the user access request before generating the signed and encrypted access token.

11. The method of claim 9, wherein determining user authorization to access the service endpoint node of the microservice container based upon the decrypted access token comprises:

extracting, by the security proxy node, the user identifier and the one or more access permissions associated with the user from the decrypted access token;

transmitting, by the security proxy node, the user identifier and the one or more access permissions associated with the user to a policy agent in the microservice container; and receiving, by the security proxy node from the policy agent, an indication to allow user access based upon the user identifier and the one or more access permissions.

12. The method of claim 9, wherein validating the security certificate and the access token received from the gateway node comprises:

requesting, by the security proxy node, the public key that corresponds to the access token from the key management service;

validating, by the security proxy node, a signature in the security certificate using the public key; and validating, by the security proxy node, the access token using the security certificate.

13. The method of claim 9, wherein the key management service node periodically rotates existing key pairs out of use and periodically rotates new key pairs into use.

14. The method of claim 9, wherein the plurality of microservice containers are independent of each other and the security proxy nodes of each microservice container do not use a central data repository or a central service to determine user authorization to access the service endpoint node of the microservice container based upon the decrypted access token.

15. The method of claim 9, wherein providing the remote computing device with access to one or more services based upon the user access request comprises forwarding the user access request to one or more other service endpoint nodes that are coupled to the service endpoint node.

16. The method of claim 15, wherein the one or more other service endpoint nodes provide the remote computing device with access to services based upon the user access request without requiring determination of user authorization to access the one or more other service endpoint nodes.

* * * * *